(12) United States Patent
Lankreijer (10) Patent No.: US 8,429,672 B2
(45) Date of Patent: Apr. 23, 2013

(54) METHOD FOR CARRYING OUT THE DATA TRANSFER BETWEEN PROGRAM ELEMENTS OF A PROCESS, BUFFER OBJECT FOR CARRYING OUT THE DATA TRANSFER, AND PRINTING SYSTEM

(75) Inventor: Herman Lankreijer, Hofsingelding (DE)

(73) Assignee: Océ Printing Systems GmbH, Poing (DE)

( * ) Notice: Subject to any disclaimer, the term of this patent is extended or adjusted under 35 U.S.C. 154(b) by 1145 days.

(21) Appl. No.: 11/915,887

(22) PCT Filed: May 31, 2006

(86) PCT No.: PCT/EP2006/062757
§ 371 (c)(1),
(2), (4) Date: Nov. 29, 2007

(87) PCT Pub. No.: WO2006/131471
PCT Pub. Date: Dec. 14, 2006

(65) Prior Publication Data
US 2008/0209439 A1 Aug. 28, 2008

(30) Foreign Application Priority Data
Jun. 8, 2005 (DE) .......................... 10 2005 026 256

(51) Int. Cl.
*G06F 3/00* (2006.01)
(52) U.S. Cl.
USPC ........................................................ 719/314
(58) Field of Classification Search .................. None
See application file for complete search history.

(56) References Cited

U.S. PATENT DOCUMENTS

| 5,276,840 | A | | 1/1994 | Yu |
|---|---|---|---|---|
| 5,305,253 | A | * | 4/1994 | Ward ................................ 365/73 |
| 5,339,413 | A | * | 8/1994 | Koval et al. .................... 719/314 |
| 5,388,219 | A | * | 2/1995 | Chan et al. ........................ 710/5 |
| 5,791,790 | A | * | 8/1998 | Bender et al. .................... 400/61 |
| 6,052,743 | A | | 4/2000 | Schwan et al. |
| 6,421,682 | B1 | * | 7/2002 | Craig et al. .................... 707/740 |
| 6,687,805 | B1 | * | 2/2004 | Cochran ........................ 711/209 |
| 7,266,825 | B2 | | 9/2007 | Lankreijer |
| 2003/0041086 | A1 | * | 2/2003 | Lankreijer ..................... 709/102 |
| 2004/0187135 | A1 | * | 9/2004 | Pronovost et al. ............. 718/104 |
| 2004/0263905 | A1 | * | 12/2004 | Okuyama .................... 358/1.16 |
| 2006/0259571 | A1 | * | 11/2006 | Talluri et al. .................. 709/213 |

FOREIGN PATENT DOCUMENTS
JP       07 323602 A      12/1995

OTHER PUBLICATIONS

Unix™ Systems Programming—Kay A. Robbins—Steven Robbins—2003.
"Win 32 Multitheaded Programming", Aaron Cohen and Mike Woodring, O'Reilly & Associates Inc., ISBN 1-56592-296-4 pp. 258-269 and 301-303 Jan. 1998.

(Continued)

*Primary Examiner* — S. Sough
*Assistant Examiner* — Carina Yun
(74) *Attorney, Agent, or Firm* — Schiff Hardin LLP (57) ABSTRACT

For implementation of a transfer of data between two program elements, a buffer object is provided between and linking the program elements. One of the program elements writes data into the buffer and the other program element reads data from the buffer, thus driving data transfer. The program element writing the data causes the buffer to call the reading program element. The program element reading the data causes the buffer object to call the writing program element.

10 Claims, 7 Drawing Sheets

OTHER PUBLICATIONS

Perkins C L: "Teach Yourself Java in 21 Days—Day 19—Streams", Teach Yourself Java in 21 Days, Mar. 5, 2001, XP002329242.

"Using the CharSequence Interface and Programming With Buffers", Sun Developer Network—Technical Articles and Tips, Jun. 4, 2002.

Merlin Hughes URL—HTTP Com/Developerworks/Java/Library Turning streams inside out, Part 2: Optimizing internal Java 1/0 Internet Publication Sep. 3, 2002.

P. Nienaltowski et al "Oncurrent Object-Oriented Programming on .NET—The Rotor Net Platform" IIE Proceedings: Software, IEE 150, No. 5, Oct. 27, 2003.

"Buffer Class Reference" GNU CommonC++Reference Jan. 29, 2004.

Giuseppe Milicia et al—The Inheritance Anomaly: Ten Years After 2004 ACM Symposium on Applied Computing Mar. 14, 2003 pp. 1267-1274.

Wefts+Threading Library. Release 0.99c Apr. 9, 2004.

Digital Printing Technology and Printing Techniques of Oce Digital Printing Presses Feb. 2005.

* cited by examiner

| Monitoring field | Buffer |
|---|---|
| Flag | Buffer section |
| 0) Invalid | <> |
| 1) Valid | <Data> |
| 2) Valid | <Data> |
| 3) Valid | <Data> |
| 4) Reserved | <Data> |
| 5) Reserved | <Data> |
| 6) Invalid | <> |
| 7) Invalid | <> |

METHOD FOR CARRYING OUT THE DATA TRANSFER BETWEEN PROGRAM ELEMENTS OF A PROCESS, BUFFER OBJECT FOR CARRYING OUT THE DATA TRANSFER, AND PRINTING SYSTEM

BACKGROUND

The preferred embodiment concerns a method for implementation of the data transfer between program elements of a process as well as a buffer object for implementation of the data transfer between program elements of a process and a printing system that is designed to execute the method of the preferred embodiment.

The programming and synchronization of threads is explained in "Win 32 Multithreaded Programming", Aaron Cohen and Mike Woodring, O'Reilly & Associates Inc., ISBN 1-56592-296-4, in particular on the pages 258 through 269 and 301 through 303. Such threads are subsequently designated as program segments.

A computer comprises a central processing unit (CPU) and data memory. The fundamental functions of a computer are controlled by an operating system. The operating system subdivides the memory into a plurality of logical memory regions.

One or more computer programs can be executed on the computer. A computer program normally comprises a single process. A separate virtual memory range is associated with each process for communication within this process. A process can comprise one or more program segments or threads.

A program segment in turn comprises one or more objects. The individual objects comprise one or more methods, corresponding fields, and variables.

The term "class" was coined in object-oriented programming and, in the sense of the present patent application, means a closed unit that comprises data as well as methods stored in fields and variables. The classes are converted into objects, whereby the respective objects represent the runtime program of the class. A specific object can be a component of different program segments, meaning that the methods contained therein can be called by the different program segments. The same objects of different program segments differ only in the data stored in the fields and variables. They possess the same program structure.

It is known to link a plurality of processes into a process chain, whereby special communication programs are used for this that control the communication between the individual processes. These communication programs can be designed for data transfer within a computer or even within a network. Given such process chains the data are normally cached by the communication programs between the individual processes, normally on a mass storage such as, for example, a hard drive.

A method for synchronization of program segments of a computer program arises from WO 01/40931 A2. This method is provided for synchronization of program segments that can run on different processors.

This method for synchronization of program segments provides a buffer in which the reading and writing is controlled by means of a standard function (such as, for example, a semaphore) as well as by means of one or more buffer segment flags. For this the buffer is controlled with the standard function and with the buffer flag by buffer methods.

This control occurs such that during the access of a first buffer method to the buffer a simultaneous access to the buffer for a second method is prevented. The access by read program segments and generator program segments to buffer segments is controlled with the buffer segment flags that are set by the buffer method. Specific buffer segments are released with the access of the buffer methods. After an occurred release it is possible that data are simultaneously read or written into different buffer segments.

This method is very advantageous for program segments running on different processors since the data transfer between the individual program segments is designed to be very efficient and versatile and the data are transferred asynchronously between individual program segments. This method is thus designed very simply.

As is stated above, a program segment can comprise a plurality of objects. Here it is also known to execute the communication between individual data-processing objects (which are designated in the following as DV objects) by means of buffers. Differentiation is made between DV objects that generate data for another DV object (and which are designated in the following as write objects) and DV objects that process such data and are designated in the following as read objects. The write objects write data into a buffer and the read objects read out again the data written into the buffer.

Figure 1:
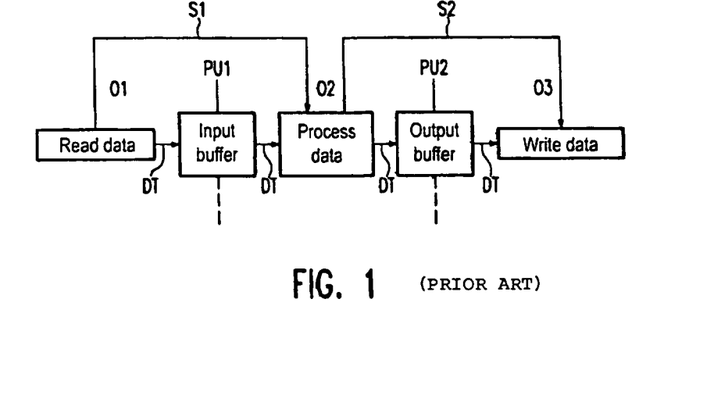
FIG. 1 illustrates schematically the data transfer between objects according to a known method.

FIG. 1 schematically shows three DV objects O1, O2, O3 and two buffers PU1 and PU2 respectively arranged between the DV objects O1, O2, O3. The buffers PU1 and PU2 in turn represent objects. The data transfer between the DV objects and the buffers is represented with the arrows DT. The DV object O1 is a write object for the buffer PU1 since it writes data into this buffer. The DV object O2 is a read object with regard to the buffer PU1 since it reads data from this buffer PU1. The data read out by the DV object O2 are processed by it and subsequently written into the buffer PU2. The DV object O2 is a write object with regard to the buffer PU2. The data written into the buffer PU2 are read out again by the DV object O3.

The control of the data transfer occurs via calling of a method of one DV object by another DV object.

The DV object O1 thus calls a control method (S1) in the DV object O2 when the input buffer PU2 is fully written with data. The object O2 hereupon reads out the data stored in the buffer PU1. The object O2 calls a corresponding control method (S2) in the object O3, whereupon this reads out the data from the buffer PU2. If the DV object O3 has completely read out all data, the control method (S2) (and herewith also the control method (S1)) is also ended, whereby the program workflow is reset to the DV object O1. The DV object O1 can then write further data into the buffer PU1 again. The control methods can also be designed somewhat differently. In principle, however, known controls of the data transfer between DV objects operate via calling of a control method of one DV object by another DV object.

Given this control of the data transfer an object that calls a method of a further object must be known to the further object, meaning that the corresponding properties of the further object or its function are to be taken into account in the programming of such an object or its class.

Since the calling of a method of a further object can depend on different conditions (for example a buffer is full or no further data are present for writing into the buffer), the control of the data transfer across a plurality of objects can be very complex.

The communication between the objects within a process must be unambiguously defined once via the transmission of the control signals directly from one object to a further object. The structure of the data transfer can only be altered when the objects affected by this are also correspondingly changed, in particular when their interaction with the control methods is altered. In practice individual objects are therefore normally programmed as a unit and then no longer altered.

A method for implementation of a data transfer between program elements arises from "Turning streams inside out, Part 2: Optimizing internal Java I/O", Internet publication, 3 Sep. 2002, pages 1 through 17, XP002348074. In this a ring buffer is used in which two program elements can access in the form of threads. For synchronization updated values are generated that reflect the state of the buffer. When a program element wants to read data from the buffer, it queries whether data are available. When data are available, these are read. Otherwise this program element passes into a wait state.

SUMMARY

It is an object to achieve a method and system for implementation of the data transfer between program elements of a process, which method is designed simply, ensures a secure data transfers and allows a flexible alteration of processes or the program elements contained thereon or objects; in particular a simple insertion and deletion of objects from processes should be allowed.

In a method or system for implementation of a transfer of data between two program elements of a process, a buffer object is provided between and linking two program elements. The buffer object comprises a buffer and control methods. A control method of a buffer object informs one of the linked program elements when the buffer is full or empty, the one link program element beginning with a reading of the data from the buffer or with a writing of the data into the buffer. The two linked program elements comprise one of the program elements writing the data into the buffer and the other program element reading data from the buffer, the program element writing the data driving the data transfer such that via the writing of the data into the buffer it causes the buffer object, via an informing of the program element reading the data, to call this program element and thereby trigger the reading of the data from the buffer. Alternatively, the two linked program elements comprise one of the program elements writing data into the buffer and the other program element reading data from the buffer, the program element reading the data driving the data transfer such that via the reading of the data from the buffer it causes the buffer object, via an informing of the program element writing the data, to call this program element and thereby trigger the writing of further data into the buffer.

DESCRIPTION OF THE PREFERRED EMBODIMENT

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

In the method the data transfer is implemented between program elements of a process, whereby a buffer object that comprises a buffer and control methods is respectively provided between two program elements. A control method of the buffer object informs one of the associated program elements when the buffer is full or empty, whereby this program element begins with the reading of the data from or the writing of the data into the buffer.

After receiving this information, the program elements can independently begin the writing or the reading of the buffer. No direct communication between individual DV objects is necessary.

This "active buffer" with its control methods can be provided between arbitrary program elements. A single buffer class is advantageously provided that serves for generation of a plurality of buffer objects of the preferred embodiment.

Program elements in the sense of the present preferred embodiment are objects, functions, threads and methods. However, the program elements are advantageously objects in the sense of object-oriented programming that are generated by means of classes.

Furthermore, the preferred embodiment provides a software product with a buffer class for generation of such a buffer object or a buffer object as such.

The buffer object of the preferred embodiment can be used to connect two process parts into a single process. This is very advantageous since the individual process parts can be created and tested independently of one another and be executed together in a single process via the buffer object, whereby the processing speed increases significantly in comparison to an execution of the process parts in independent processes. Such a process designed with the buffer object is thus constructed modularly from a plurality of process parts.

Figure 2:
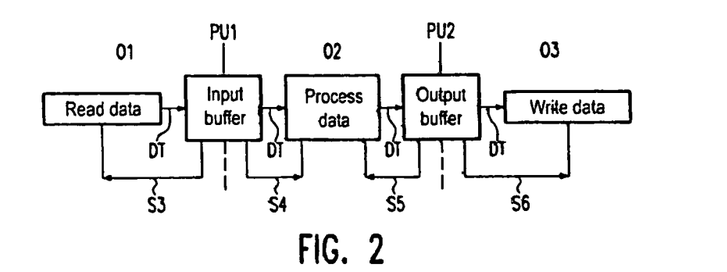
FIG. 2 illustrates schematically the data transfer according to the method of a preferred embodiment.

In the preferred embodiment method data are transferred between individual objects O1, O2, O3 of a process (FIG. 2). These objects are data processing objects that are designated as DV objects in the following. A buffer object PU1, PU2 that comprises at least one memory region acting as a buffer and one or more control methods are respectively provided between the DV objects. A control method of the buffer objects PU1, PU2 informs the DV object O2, O3 read from the respective buffer whether the respective buffer section of the buffer objects PU1, PU2 is full (S4, S6). If this is the case, the DV objects O2 and O3 begin with the reading of the data from the respective buffer sections. The control methods of the buffer objects PU1 and PU2 inform the DV objects O1 or O2 writing in the buffer sections (S3, S5) when the respective buffer section is empty, whereby the corresponding DV object O1, O2 can begin the writing of the data into the buffer section insofar as corresponding data are present at the DV object O1, O2 (FIG. 2).

A buffer class comprises: a memory region; the buffer in which are stored one or more buffer sections; a further memory region; the monitoring field in which administration data for the buffer are stored; and the control methods.

This class is inherited by the individual objects once or multiple times, meaning that the program structure of the buffer and of the control methods is generated once or multiple times in the respective process in the generation of an object, such that they respectively execute the data transfer between two DV objects. The plurality of buffers of a process in turn respectively represent an object that in the following are designated as buffer objects. The buffer objects of a process do in fact respectively possess the same program structure. However, they differ with regard to the memory regions and the data stored in the fields or variables which one accesses.

The buffer object explained above can be used in a very advantageous, dynamic manner for linking of a plurality of individual processes into a single common process as it is subsequently explained in detail. In many applications process chains are used, meaning that individual processes communicate with one another by means of special communication programs and thus handle a common task. Such modularly constructed process chains possess the advantage that individual processes can be programmed and tested separately and be modularly assembled with further processes after their production. However, the communication between the individual processes is complicated and normally requires a writing to the hard drive and a reading from the hard drive since these operations cannot be executed within the virtual memory region associated with a process.

A plurality of individual processes can be connected into a single common process with the buffer object, such that no communication across a plurality of processes (which significantly delays the workflow) is necessary. Via the provision of the inventive buffer object, the individual original processes (which are designated as process parts in the following) are modularly linked with one another, whereby the buffer object represents a standard interface between individual process parts. This linking of the process parts can occur manually in the programming on the one hand or also can be independently executed dynamically upon generation of objects from classes.

The linking of the individual process parts into a process occurs in that the buffer object is arranged between the source code units of the individual process parts and the input and output commands of the process parts are rerouted to the buffer object, such that the communication between the individual process parts runs completely via the buffer objects. The source code so linked is then compiled together into a single program that is executed as a single process.

Alternatively, finished compiled partial processes can also be linked in advance with the buffer objects into a single process. Finished compiled partial processes are also often designated as shared libraries under UNIX. What are known as dll files correspond to these under Windows. The linking occurs by means of a configuration file in which it is defined how the process parts are linked with one another by means of the buffer object. The linking of the process parts can occur dynamically, whereby the process generated hereby accesses the finished compiled partial processes by means of a reference. The dynamic linking of process parts occurs by means of a service program (designated as a "program loader") that connects programs with one another during the run time (runtime linking).

In the dynamic linking a pointer to the corresponding process part (which is a DV object) is associated with the buffer object. The dynamically linked buffer objects contain standard methods for reading or writing of data. Standard methods here mean that the methods for reading or writing of data into the individual process parts or, respectively, DV objects to be linked possess the same name or the same identifier, such that the data transfer is executed via calling of the standard methods, whereby the standard methods are called by the buffer objects in the individual DV objects.

The class of the buffer objects advantageously comprises clearing methods in which the methods for calling the methods in the DV objects for reading or writing of data are inherited upon generation of the buffer objects. From the inheritance such clearing methods possess a NO-operation (=NOP) as a single command. After the inheritance the calling of the corresponding method in the DV object is entered into this method.

Given a non-dynamic linking in which linked source code of DV objects and the buffer object are compiled together, the calls of the methods in the DV objects can be set manually. However, here it is also appropriate to use standard methods in the DV objects since the program structure is thereby significantly simplified.

The present method is a development of the method described in WO 01/40931, which is why this document is referenced in terms of its entire content.

In the method of the preferred embodiment a group of administration data is respectively associated with each buffer section, which group of administration data comprises a flag (FIG. 7), a specification about the size of the buffer section and a specification about the content of the data stored in the buffer. The flag is a state variable that can assume three states, namely "invalid", "valid" and "reserved". If the flag is "invalid", this means that no data provided by the write object are contained in the associated buffer section. If the flag is "valid", data that can be read by the read object have been written from the write object into the associated buffer section. If the flag is "reserved", this means that the write object has already written data into the associated buffer section, however these data are not yet released for reading by the read object. For this the flag must be set to "valid".

The buffer class or the buffer object generated from this also comprises some buffer methods such as, for example, GetToBufPntr, GetFromBufPntr, ReleaseToBufPntr and ReleaseFromBufPntr. Furthermore, the clearing methods AppEmptyBuf and AppFillBuf are provided in the buffer class.

Figure 7:
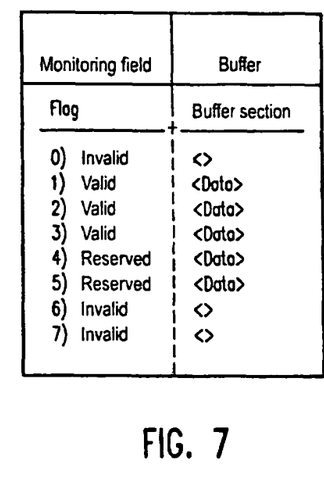
FIG. 7 shows schematically an example for a buffer with the flags associated with the respective buffer segments in a tabular presentation.

FIG. 7 shows the flags and buffer sections of the buffer class schematically in a tabular presentation. In total 8 buffer sections are provided with which a flag is respectively associated. The buffer section 0 (uppermost buffer section in FIG. 7) comprises no data provided for reading, which is why the value "invalid" is assigned to the associated flag. The further buffer sections 1 through 5 comprise data, whereby the buffer sections 1 through 3 can be read. The buffer sections 4 through 5 are not yet released by the write object. The value "valid" is correspondingly associated with the flags associated with the buffer sections 1 through 3 and the value "reserved" is associated with the flags associated with the buffer sections 4 and 5. The further buffer sections 6 and 7 comprise no data released for reading, which is why the flags associated with them exhibit the value "invalid". A write object can write data into the buffer sections 6, 7 and 0 and a read object can read data from the buffer sections 1 through 3.

Figure 8:
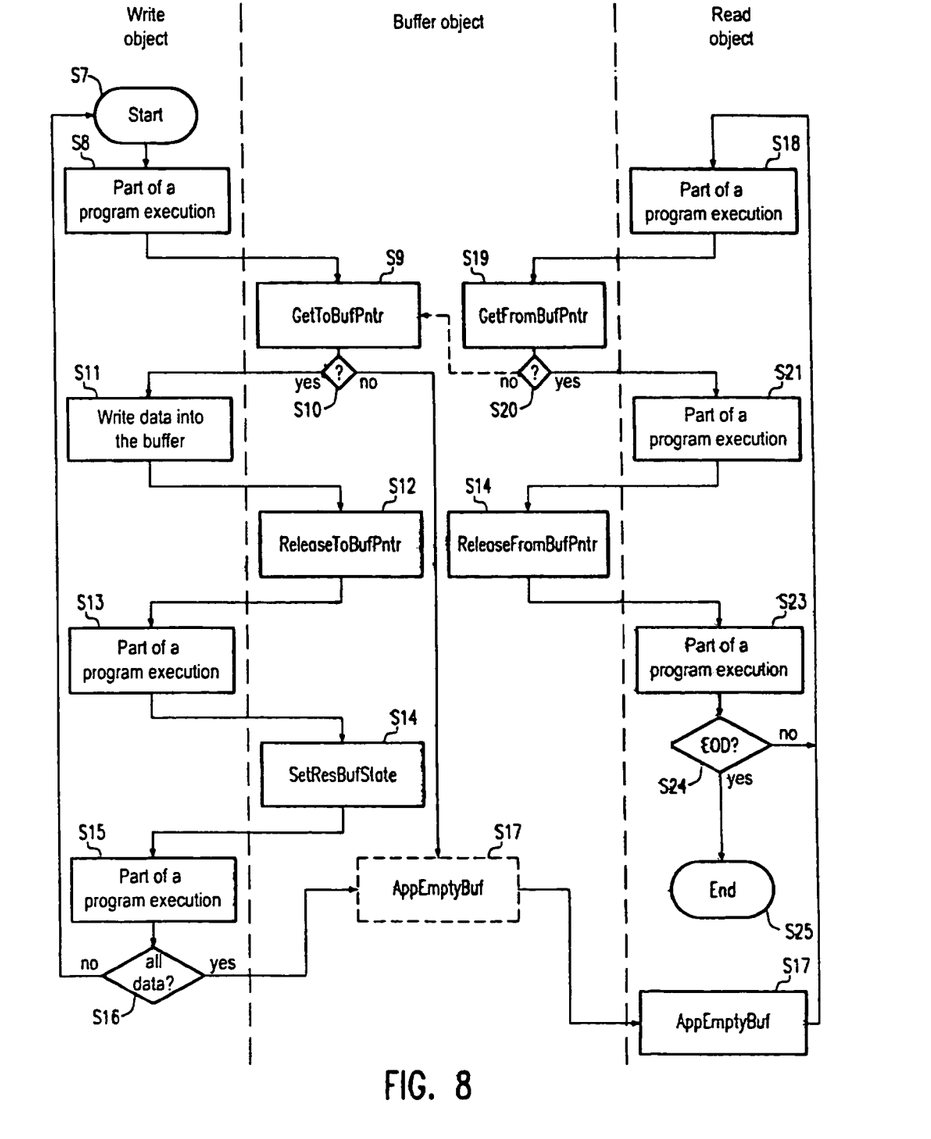
FIG. 8 shows in schematically simplified fashion the reading and writing according to an embodiment in a block diagram, subdivided into three regions: the region of the write object, the buffer object and the read object; and the blocks respectively arranged in the region in which the are executed.

FIG. 8 schematically shows the interaction of a write object and a read object that receives data buffered by the write object in buffer object of the preferred embodiment. The write object starts with a step S7. The workflow of a predetermined region of the write object with which data are generated for the read object is schematically presented in FIG. 8 with a step S8. In step S9 the buffer method GetToBufPntr is called that is a component of the buffer object. With the calling of this buffer object it is queried whether a buffer section with the size M1 is free in the buffer for writing of data. Using the write pointer determined in step S9, in step S10 it is checked whether a memory region is free. If this is the case, this buffer object passes to the write object a write pointer and a parameter M2 that indicates the size of the available memory region. M2 is at least as large as M1. The write pointer contains the address of the start of the available memory region.

In step S11 data are written directly into the available memory region using the starting address of the available memory region and the maximum available memory region.

When all data have been written into the memory region, this memory region represents a buffer section and in step S12 the buffer method ReleaseToBufPntr is called with which the flag of the written buffer section is set either to "valid" or to "reserved depending on whether the data are released for reading by the read object or not.

Further processing procedures of the write object are symbolically represented with the steps S13 and S16. The buffer method SetResBufState (<Flagtype>) is called with the step S14 situated in-between the steps S13 and S16, with which buffer method SetResBufState (<Flagtype>) the buffer section written in step S11 but not yet released is either released for reading (in that the corresponding flag is set from "reserved" to "valid") or is "erased" for the read object (in that the corresponding flag is set from "reserved" to "invalid"), whereby this memory region can be newly written to by the write object.

In step S16 it is queried whether all present data are written into the buffer. In the event that this is not the case, the program workflow transitions to the step S7 and further data are written into a further buffer section.

In the event that it has resulted in step S10 that no sufficient buffer section is free, the program workflow transitions to the step S17. The program workflow also transitions to the step S17 in the event that it has been determined in step S16 that all data have already been written into the buffer. S17 is the buffer method AppEmptyBuf, which is a clearing method. It is therefore represented as a buffer object with a dashed box. In the clearing method AppEmptyBuf of the buffer object a corresponding method AppEmptyBuf of the read object is inherited, which is why this corresponding method is also designated with the reference character S17 in the region of the read object. The program workflow of the read object is hereby called.

This is presented on the right side in FIG. 8. The representation in FIG. 8 is purely schematic and does not reflect the correct time progression. A section of the program workflow in which a demand for data of the write object arises is presented in step S18. The read object therefore calls the buffer method GetFromBufPntr S19. This buffer method queries whether a buffer section with data that are released for reading by the read object is written in the buffer. Using the content of a read pointer determined in the step S19, in step S20 it is determined whether released data are present. In the event that this is the case (yes), a read pointer and the size of the buffer section that is written with data released for reading is output to the read object. The read pointer comprises the address of the start of the buffer section released for reading.

If the read procedure is terminated, the read object thus calls the buffer method ReleaseFromBufPntr S22 with which the buffer section read out by the read object is released for rewriting (this means that the corresponding flag is set from "valid" to "invalid").

The further program workflow executed by the read object is schematically represented with S23.

In step S24 it is subsequently checked whether all data have been read. This can, for example, be determined using an EOD (end of data) flag that is also determined in step S19. In specific applications it is also appropriate to query an EOF (end of file) flag instead of an EOD flag. If the query in step S24 yields that all data have been read in, the program workflow transitions to the step S25 with which the transfer of the data is ended.

To the contrary, if the query in step S24 yields that all data have not yet been written, the program workflow forks again to the step S18, whereby further data or a further buffer section is read out.

If the query in step S20 yields that no data available for reading are present, the program workflow transitions again to the step S9 so that further data are written by the write object into the buffer. This forking from the step S20 to the step S9 is represented with a dashed line in FIG. 8 since the forking is executed by means of a "return code". This means that the pointer of the program workflow is not immediately set to the step S9, but rather that the program workflow falls back to the step S9 in that the methods of the steps S17 through S20 that are arranged above this in the program stack are removed. An overflow of the program stack is hereby prevented.

In step S9 it is again checked (as is described above) whether a buffer section with sufficient size is free for writing of data. The data are then written into the buffer corresponding to the method described above. This is repeated until all data have been written into the buffer and read out from this.

In the method shown in FIG. 8 the transfer of the data is driven from the write object, meaning that given the presence of data the write object writes these into the buffer and calls the read object via the method AppEmptyBuf every so often until all data are read.

Figure 9:
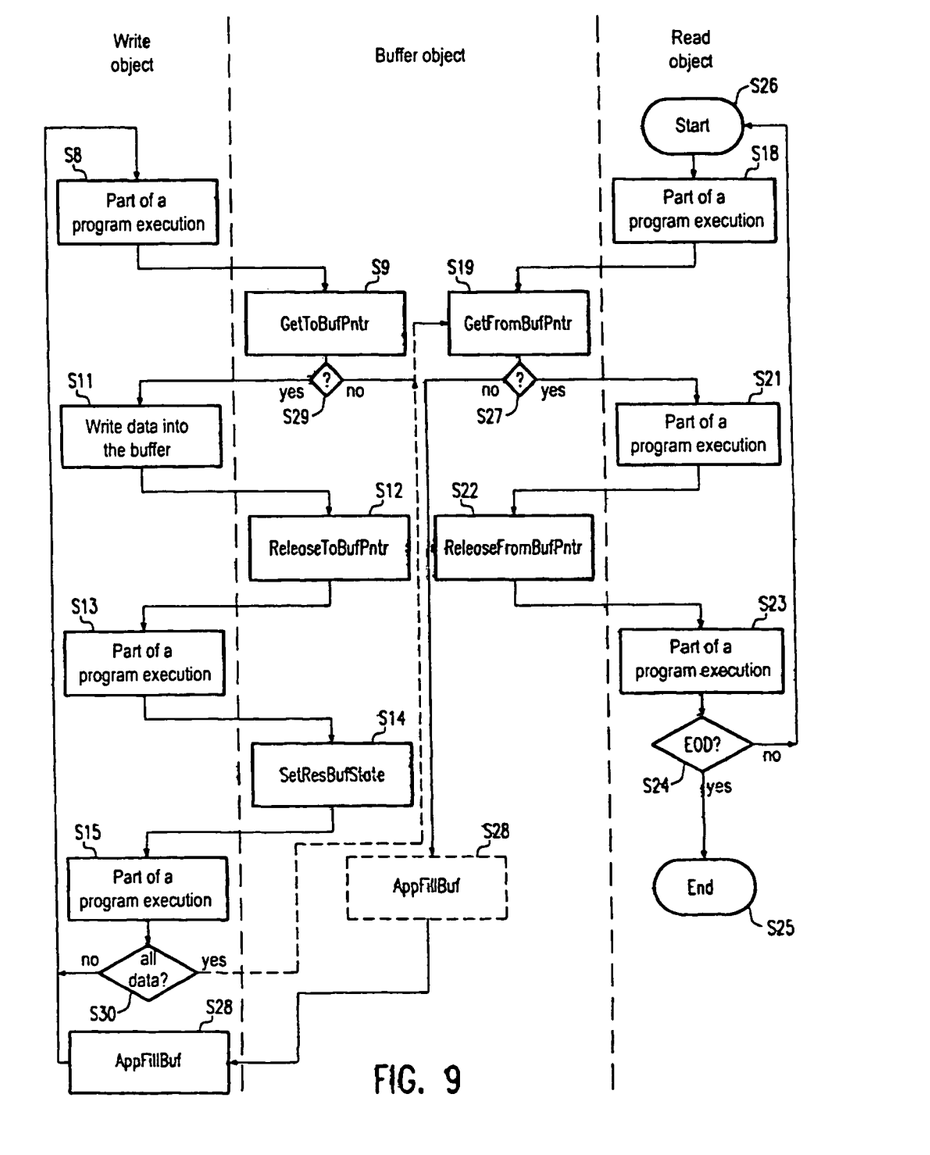
FIG. 9 shows in schematically simplified fashion the reading and writing according to a further embodiment in a block diagram, subdivided into three regions: the region of the write object, the buffer object and the read object; and the blocks respectively arranged in the region in which they are executed.

FIG. 9 shows a further embodiment of the method that is designed similar to the method shown in FIG. 8, however is driven by the read object, meaning that given a query of data the read object seeks to read the data from the buffer and, in the event that no corresponding data are present, calls the write object in order to write the data into the buffer. In the process shown in FIG. 9 the methods or program steps that are identical with the method shown in FIG. 8 are designated with the same reference characters. Altered or new methods are provided with a new reference character.

This method begins at the query for data in step S26 in the read object. The method workflow then transitions to the method steps S18 and S19 (GetFromBufPntr). With the method step S19 it is queried whether a buffer section with data that are released for reading by the read object is written into the buffer.

Using the content of a read pointer determined in step S19, in the subsequent step S27 it is determined whether released data are present.

In the event that this is the case (yes), the data are read (S21), the buffer section is released (S22), a further program workflow is executed (S23) and it is checked whether all data have been read (S24). In the event that all data have been read, the method is ended with the step S25. Otherwise the method workflow returns back to the start S26.

However, in the event that it is established in step S27 that no data released for reading are present, the method workflow transitions to the step S28. S28 is the buffer method AppFillBuf, which is again a clearing method. It is therefore represented in the buffer object with a dashed box. A corresponding method AppFillBuf of the write object is inherited in the clearing method AppFillBuf of the buffer object, which is why this corresponding method is also designated with the reference character S28 in the region of the write object. The program workflow of the write object is called with the method AppFillBuf.

The step S8 then transitions to S9 (GetToBufPntr). With the step S9 it is queried whether a buffer section with sufficient size for writing of data is free in the buffer.

Using the content of the write pointer determined in step S9, in the following step S29 it is checked whether a corresponding memory region is free. If this is the case, the data are written into the buffer (S11), the flag is set either to "valid" or "reserved" (S12), further processing procedures of the write object are executed (S13, S15) and, if applicable, the flag is set from "reserved" to "valid" or "invalid" (S14).

In the query S30 it is subsequently checked whether all data are written into the buffer. If this is not the case (no), the method workflow transitions again to the step S8 in order to write further data into the buffer.

To the contrary, if the query in step S29 yields that no memory region is free, or the query in step S30 yields that all data have been written, the method workflow transitions to the step S19 with which a change from the method segment of the writing of the data to the method segment of the reading of the data is executed. This transition of the method workflow to the step S19 is represented with a dashed line in FIG. 9 since it is executed by means of a "return code". This means that the pointer of the program workflow is not immediately set at the step S19, but rather that the program workflow falls back to the step S19 in that the methods of the steps S8, S9, S29 and possibly S11, S12, S13, S14, S15, S30 arranged above this in the program stack are removed. An overflow of the program stack is hereby prevented.

The two methods explained above and shown in FIGS. 8 and 9 differ from the method according to WO 01/40931 in that there is no state in which it is waited until the buffer is free or until data released for reading are contained in the buffer. Such wait states are appropriate in applications with a plurality of processes since another process can be executed during the wait state of a specific process. However, with the buffer of the preferred embodiment object the entire method workflow can be executed within a single process, whereby the method is designed such that a specific action is respectively executed without a wait state being adopted.

The significant difference of the method thus lies in that the read object is called from the buffer object by means of the method AppEmptyBuf or the write object is called from the buffer object by means of the method AppFillBuf. Most typical methods are designed very similar or identical to the corresponding methods or program steps of the method known from WO 01/40931.

The linking of a plurality of processes is subsequently explained using an example.

Figure 3:
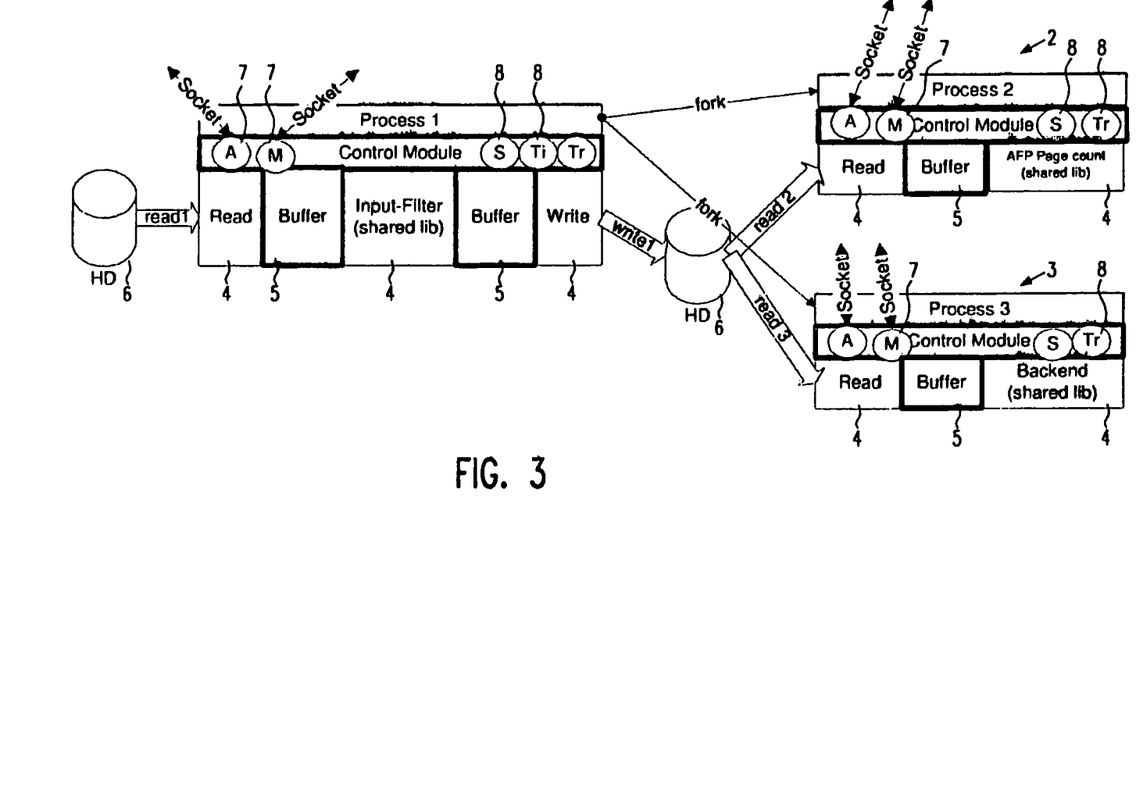
FIG. 3 shows three processes with a buffer object of a preferred embodiment.

FIG. 3 shows three processes 1, 2, 3 that respectively comprise a plurality of DV objects 4 that are coupled with the buffer objects 5 within the processes.

The process 1 serves for importation of data, in particular a print file, and for filtering of imported data with a predetermined input filter. A print file is converted with the input filter, whereby (for example) the data format is changed. For example, with such a conversion a data format with "fixed record lengths" is converted into a data format with "variable record lengths", as is often necessary for the further processing. The process 1 writes the data so filtered to a hard disk 6. The processes 2 and 3 read the data from the hard disk 6, whereby the process 2 (AFP page count) counts the data of the print file during the run time and displays it on an output device (monitor) and the process 3 (backend) generates an IPDS data stream for output to a printer. What are known as sockets 7 for communication to the outside are integrated into the individual processes. A socket 7 is a software element that operates on a network device such as a communication endpoint. A socket comprises an address, a protocol and a port. In the present example the following sockets 7 are provided:

A Accounting module
M Message module

Furthermore, the following standard objects 8 are integrated into the process:

L License module
S Signal module
Tr Trace module
Ti Ticket module

Standard objects are objects that can be used by a plurality of processes.

In the connection of only two processes only the output-side DV object 4 (write) and the input-side DV object 4 (read) is to be replaced by the buffer object 5, such that the data are relayed directly from the writing process to the reading process. To the contrary, in the present example the data written by the process 1 are read by the processes 2 and 3. The data are thus forked. To execute the forking, the DV object 4 of the process 1 is replaced by a buffer object 5 (FIG. 4) that reads the incoming data stream twice and thus copies it into two identical data streams. The flag is hereby first set by the buffer object to "invalid" when the read process has been implemented twice by one or more read objects, such that the data are released for writing by a data-writing DV object only after said data have been read twice. A duplication of a data stream is hereby achieved in a very simple and efficient manner.

Figure 4:
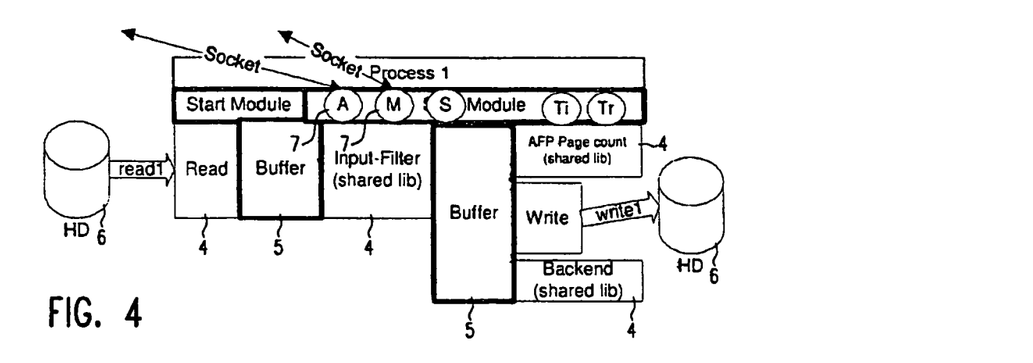
FIG. 4 through FIG. 6 respectively show a process comprising the objects of the three processes from FIG. 3.

The processes 1, 2 and 3 from FIG. 3 are thus linked into a single process (FIG. 4). The sockets 7 of the processes 1, 2, 3 from FIG. 3 possess the same address and operate with the same protocols, however differ in their ports. Upon linking the sockets 7 are adapted to one another within the linked single process, whereby the same port is assigned to all sockets 7 with the same functionality.

The process according to FIG. 4 represents a synchronous printing process, meaning that the files are printed and stored simultaneously.

Figure 5:
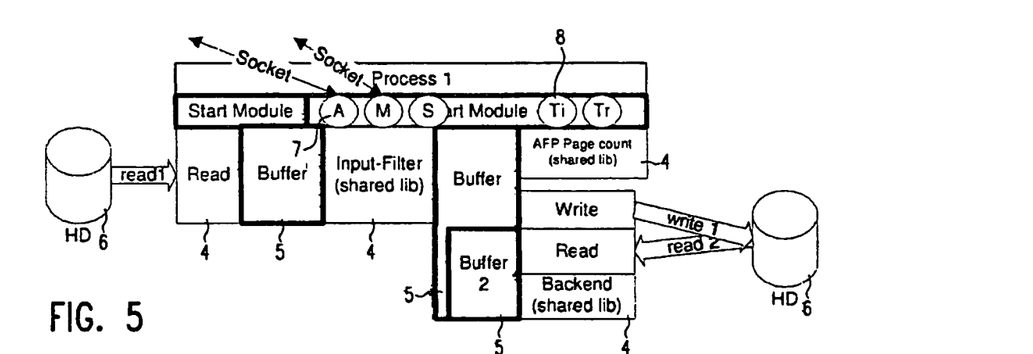

An asynchronous printing output means that the data to be printed are immediately stored but are only possibly printed later. In the embodiment according to FIG. 5 the data are initially written to the hard disk 6 at the end of the process in order to then be imported again, whereby the imported data are then relayed for print output. The print output can hereby occur asynchronously relative to the other processing of the data.

Figure 6:
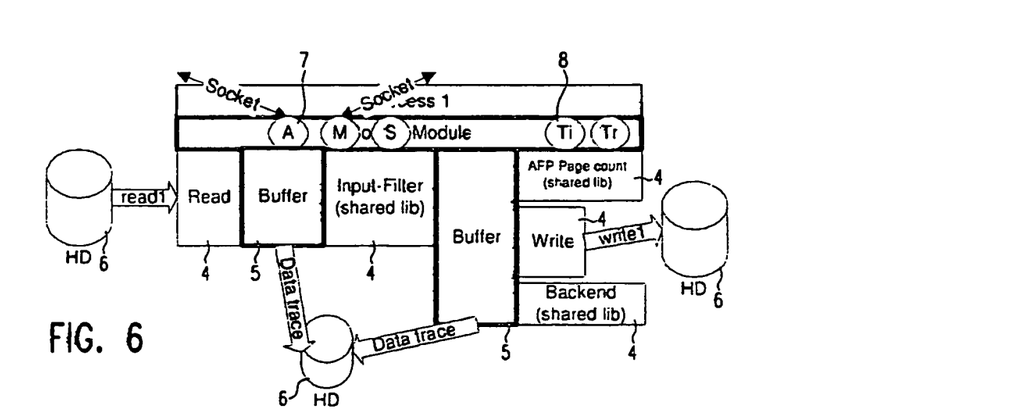

FIG. 6 shows a further advantage of the method, since via the multiple usage of the buffer object it is possible to simply implement certain additional functions that can be executed in each buffer. In this example the buffer object 6 is expanded with a trace function that writes specific trace files to the hard drive so that the processing of the data stream in the process can be monitored. The trace function can also comprise a function for automatic conversion of non-readable data (for example in EBCDIC format) into a readable format or a format that can simply be presented on a monitor (such as, for example, ASCII code). During the processing in the respective process the data can herewith be simultaneously presented on an output device (monitor) for review.

The individual buffers generated by the buffer object between the DV objects or between the program segments possess the same program structure. However, they store the data in different buffer regions.

This has a significant advantage relative to the conventional data transfer between DV objects since on the one hand the individual DV objects no longer must directly call methods of other DV objects and, on the other hand, the same buffer structure is present between all DV objects. The individual DV objects can hereby be generated separately, be tested in separate processes and, when they correspond to the desired requirements, be simply linked with one another into a common process via interconnection of the active buffer.

The linking of the DV objects into a common process significantly accelerates the data transfer between the individual DV objects since the data are kept in a virtual memory region that is associated with the respective process. This virtual memory region is normally a component of the working memory (RAM), which is why the data are typically not cached on a mass storage (such as, for example, a hard drive) as long as they are processed within a process. An individual DV object can be started very quickly within a process. A significant acceleration of the entire workflow is achieved via the linking of a plurality of ventilation openings within a process. In principle, a plurality of DV objects have also been linked within a process with the conventional data transfer between two DV objects. However, the data transfer between the individual DV objects must be individually regulated, which is why it is very complicated to unify a plurality of DV objects into one process with the conventional data transfer.

With the method data are written into the buffer by individual DV objects without interconnection of further administration routines or are read out from the buffer without interconnection of further administration routines. The workflow of the process is significantly accelerated in comparison to conventional methods due to this direct writing and reading. It is additionally also possible that data are simultaneously written or read in a plurality of buffers or a plurality of buffer sections since no additional administration routines must be called that often block a simultaneous writing or reading in a plurality of buffers or, respectively, buffer sections.

The active buffer forms a process-internal standard interface between the individual program segments. The activity of the individual program segments is controlled via the control messages triggered by the control method of the respective buffer.

Figure 10:
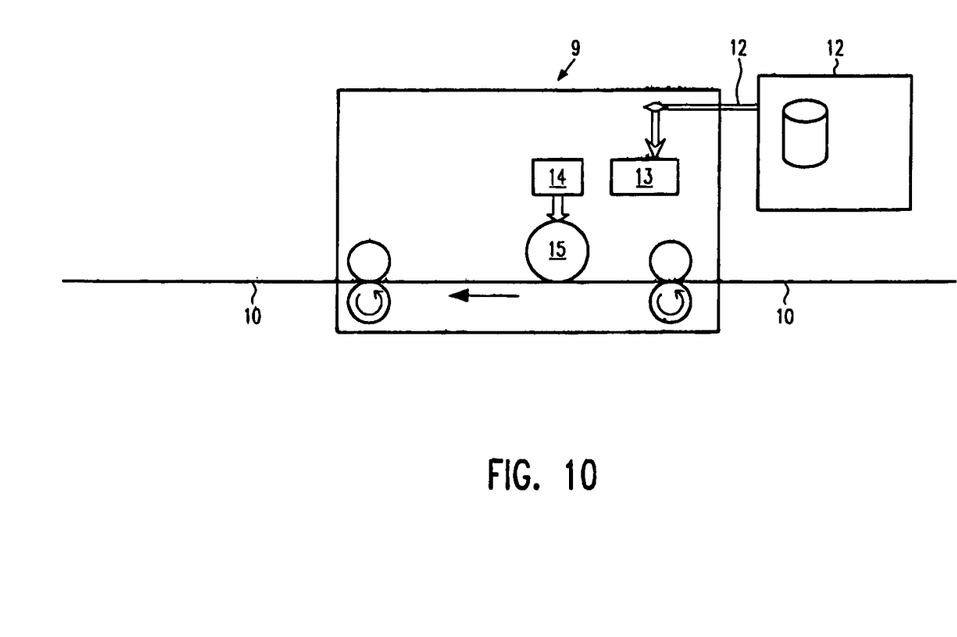
FIG. 10 shows schematically a system with a print server for execution of the preferred embodiment.

A printing system for execution of the method is presented schematically simplified in FIG. 10. This printing system comprises a printer 9 (that is advantageously a high-capacity printer) for printing of a paper tape 10. The printer 9 is connected via a data line 11 with a computer 12 from which the printer 9 receives a print data stream via the data line 11. The computer 12 is either a print server that buffers, prepares and relays the print data stream or a host at which the print job and the corresponding print data stream is generated. Such a print server for high-capacity printers is, for example, described in chapter 15 in the book "Digitaldruck, Technik und Drucktechnologien der Océ-Drucksysteme" in the 9th edition of February 2005 (ISBN 3-00-001019-X).

In the printer 9 the data line 11 leads to a controller 13 in which the print data contained in the print data stream are prepared for a subsequently arranged character generator 14.

The character generator 14 generates control signals for controlling a photoconductor drum 15 with which the print data are printed on the paper web 10. The character generator 14 and the photoconductor drum 15 form a printing group. The paper web is typically an endless paper web for high-capacity printers. However, by now printers with very high capacity that print on individual sheets are also known in which the application of the method is also appropriate.

The computer 12 can also be integrated into the printer 9.

The method is used in a computer 12 in order to be able to operate with a high throughput of the print data stream. The method can also be used in a control device integrated into the printer 9.

The above exemplary embodiments of the method concern embodiments in which the buffer object is arranged between two DV objects between which data are transferred. In the framework of the preferred embodiment it is also possible that the inventive buffer object is arranged between other program elements (such as DV objects) between which data should be transferred, such as, for example, functions, threads and methods. The buffer objects can also be used in processes that are not exclusively comprised of objects. However, the embodiment with the buffer object between two DV objects is preferable.

To the contrary, the buffer object should be an object in the sense of object-oriented programming since it is hereby ensured that the buffer object acts as a standard interface between the program elements between which data should be transferred. Alternatively, only program units that ensure that a uniform standard interface is present in multiple processes can be used as buffer objects.

In the exemplary embodiments of the present invention explained above the control methods of the buffer object (AppEmptyBuf or AppFillBuf) call a method in the read object or write object, whereby it is communicated to this object that the buffer is full or empty. In the framework of the invention it is also possible that the buffer object communicates to the read object or the write object the information that the buffer is full or empty, whereupon these objects independently start the reading or writing of the buffer. The terms "full" and "empty" are understood here such that "full" means that so much data are present in the buffer that no sufficient capacity is present for a predetermined further buffer section for writing, in contrast to which "empty" means that data released for reading are no longer present in the buffer.

In summary, the preferred embodiment provides a method for implementation of the data transfer between program elements (in particular between data-processing objects) of a process. A buffer object is provided that comprises a buffer. If the buffer is full, the buffer object independently calls a program element reading the buffer. The data written into the buffer are automatically relayed. However, the buffer object can also be designed such that it is initiated by a data-reading program element in order to call a data-writing program element insofar as no further data released for reading are present in the buffer.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A method for implementation of a transfer of data between program elements of a process, comprising the steps of:

providing an active buffer object between and linking said two program elements, the buffer object comprising a buffer and control methods, a control method of the buffer object informing a respective one of the linked program elements when the buffer is full or empty, and the two linked program elements comprising one of the program elements for writing data into the buffer and the other program element for reading data from the buffer;

when the buffer is being filled the writing program element initially driving the data transfer such that via the writing of the data into the buffer it causes the active buffer object to inform the reading program element to indicate that the buffer is full before the reading program element checks the buffer object to determine if the buffer object is full and thereby triggers the reading of the data from the buffer by the reading program element to begin emptying the buffer; and when the buffer is being emptied the reading program element initially driving the data transfer such that via the reading of the data from the buffer it causes the active buffer object to inform the writing program element to indicate that the buffer is empty before the writing program element checks the buffer object to determine if the buffer object is empty and thereby triggers the writing of the data into the buffer by the writing program element to begin filling the buffer.

2. The method according to claim 1 wherein the program elements are data-processing objects that comprise DV objects.

3. The method according to claim 2 wherein the DV objects comprise standard methods for reading or writing of data that respectively possess same names or a same identifier for invocation in the DV objects, and the informing of the DV objects by the buffer objects occurs by a standard method for reading or a standard method for writing of a data operating system called in the DV objects.

4. The method according to claim 1 wherein at least one of the program elements are at least one of objects, functions, threads and methods.

5. The method according to claim 2 wherein a plurality of buffer objects are provided which are all generated with a single buffer class.

6. The method according to claim 5 wherein the buffer class comprises:

a memory region that represents the buffer in which one or more buffer sections can be stored;

a further memory region that acts as a monitoring field in which administration data for the buffer can be stored; and control methods.

7. The method according to claim 5 wherein the class of the buffer objects comprises a clearing method as a standard method for reading or writing of the data in which methods for calling methods in the DV objects for the reading or for the writing of the data are inherited upon generation of the buffer objects.

8. The method according to claim 1 wherein the buffer object releases a buffer section for new writing only after a repeated reading of the buffer section.

9. A tangible, non-transitory computer-readable medium comprising a computer program for generation of a buffer object for implementation of a transfer of data between program elements of a process, said computer program performing the steps of:

providing an active buffer object between and linking said two program elements, the buffer object comprising a buffer and control methods, a control method of the buffer object informing a respective one of the linked program elements when the buffer is full or empty, and the two linked program elements comprising one of the program elements for writing data into the buffer and the other program element for reading data from the buffer;

when the buffer is being filled the writing program element initially driving the data transfer such that via the writing of the data into the buffer it causes the active buffer object to inform the reading program element to indicate that the buffer is full before the reading program element checks the buffer object to determine if the buffer object is full and thereby triggers the reading of the data from the buffer by the reading program element to begin emptying the buffer; and when the buffer is being emptied the reading program element initially driving the data transfer such that via the reading of the data from the buffer it causes the active buffer object to inform the writing program element to indicate that the buffer is empty before the writing program element checks the buffer object to determine if the buffer object is empty and thereby triggers the writing of the data into the buffer by the writing program element to begin filling the buffer.

10. A printing system, comprising:

a printer and a computer connected via a data line with the printer, the computer being designed to transfer print data of a print data stream to the printer such that the print data stream is transferred between program elements of a process; and the computer having a computer-readable medium comprising a computer program that performs the steps of providing an active buffer object between and linking said two program elements, the buffer object comprising a buffer and control methods, a control method of the buffer object informing a respective one of the linked program elements when the buffer is full or empty, and the two linked program elements comprising one of the program elements for writing data into the buffer and the other program element for reading data from the buffer;

when the buffer is being filled the writing program element initially driving the data transfer such that via the writing of the data into the buffer it causes the active buffer object to inform the reading program element to indicate that the buffer is full before the reading program element checks the buffer object to determine if the buffer object is full and thereby triggers the reading of the data from the buffer by the reading program element to begin emptying the buffer; and when the buffer is being emptied the reading program element initially driving the data transfer such that via the reading of the data from the buffer it causes the active buffer object to inform the writing program element to indicate that the buffer is empty before the writing program element checks the buffer object to determine if he buffer object is empty and thereby triggers the writing of the data into the buffer by the writing program element to begin filling the buffer.

* * * * *